US011277818B2

United States Patent
Zuo et al.

(10) Patent No.: US 11,277,818 B2
(45) Date of Patent: Mar. 15, 2022

(54) WIRELESS COMMUNICATION METHOD AND WIRELESS COMMUNICATION DEVICE

(71) Applicant: Sony Corporation, Tokyo (JP)

(72) Inventors: Huiling Zuo, Beijing (CN); Na Li, Beijing (CN); Haowei Wang, Beijing (CN); Tao Cui, Beijing (CN); Yuxuan Xie, Beijing (CN); Song Wang, Beijing (CN)

(73) Assignee: SONY CORPORATION, Tokyo (JP)

( * ) Notice: Subject to any disclaimer, the term of this patent is extended or adjusted under 35 U.S.C. 154(b) by 232 days.

(21) Appl. No.: 16/614,383

(22) PCT Filed: Jun. 29, 2018

(86) PCT No.: PCT/CN2018/093527
§ 371 (c)(1),
(2) Date: Nov. 18, 2019

(87) PCT Pub. No.: WO2019/007262
PCT Pub. Date: Jan. 10, 2019

(65) Prior Publication Data
US 2020/0120639 A1    Apr. 16, 2020

(30) Foreign Application Priority Data
Jul. 6, 2017    (CN) .......................... 201710546292.2

(51) Int. Cl.
*H04W 72/00*    (2009.01)
*H04W 72/04*    (2009.01)

(52) U.S. Cl.
CPC ....... *H04W 72/005* (2013.01); *H04W 72/044* (2013.01)

(58) Field of Classification Search
CPC .......................... H04W 72/044; H04W 72/005
See application file for complete search history.

(56) References Cited

U.S. PATENT DOCUMENTS

2007/0230697 A1* 10/2007 Wu ...................... H04N 21/242
                                                         380/203
2012/0327895 A1* 12/2012 Wallen .................. H04W 48/12
                                                         370/330
(Continued)

FOREIGN PATENT DOCUMENTS

| CN | 105281864 A | 1/2016 |
| CN | 105578573 A | 5/2016 |
| WO | 2016/032304 A1 | 3/2016 |

OTHER PUBLICATIONS

<<3GPP TSG RAN WG2 meeting #89bis R2-151383>> Apr. 10, 2015 Institute for Information Industy (III) Discussion on Uplink Transmission in LAA, Apr. 20-24, 2015, Bratislava, Slovakia.

(Continued)

*Primary Examiner* — Parth Patel
(74) *Attorney, Agent, or Firm* — Xsensus, LLP

(57) ABSTRACT

Disclosed are a wireless communication method and a wireless communication device. The wireless communication device comprises a processing circuit, wherein the processing circuit is configured to: detect broadcast information on a specific subchannel in an unlicensed frequency band; and broadcast time information on the specific subchannel when the broadcast information cannot be successfully detected, wherein the time the occupation of the specific subchannel by the wireless communication device ends can be determined according to the time information.

10 Claims, 8 Drawing Sheets

(56) References Cited

U.S. PATENT DOCUMENTS

| | | | | |
|---|---|---|---|---|
| 2013/0058283 | A1* | 3/2013 | Cho | H04W 48/10 370/328 |
| 2014/0112266 | A1* | 4/2014 | Seok | H04W 4/70 370/329 |
| 2014/0204882 | A1* | 7/2014 | Cave | H04W 72/0446 370/329 |
| 2014/0208349 | A1* | 7/2014 | Nair | H04N 21/6125 725/34 |
| 2014/0334462 | A1* | 11/2014 | Pradas | H04W 72/00 370/336 |
| 2015/0023185 | A1* | 1/2015 | Bodas | H04W 72/0446 370/252 |
| 2015/0055636 | A1* | 2/2015 | Rausch | H04H 20/34 370/336 |
| 2015/0296516 | A1* | 10/2015 | Jung | H04W 16/14 370/312 |
| 2016/0073433 | A1* | 3/2016 | Kwon | H04W 74/0891 370/338 |
| 2016/0095074 | A1* | 3/2016 | Park | H04W 56/001 370/350 |
| 2016/0135109 | A1* | 5/2016 | Hampel | H04W 4/70 370/315 |
| 2016/0315675 | A1* | 10/2016 | Seok | H04W 74/0816 |
| 2017/0079010 | A1* | 3/2017 | Zhang | H04W 74/0816 |
| 2017/0126411 | A1* | 5/2017 | Piqueras Jover | H04L 9/0869 |
| 2017/0135115 | A1* | 5/2017 | Cho | H04L 1/00 |
| 2017/0149579 | A1* | 5/2017 | Krause | H04L 1/16 |
| 2017/0171836 | A1* | 6/2017 | Gupta | H04W 4/06 |
| 2018/0020387 | A1* | 1/2018 | Van Der Velde | H04W 72/085 |
| 2018/0020431 | A1* | 1/2018 | Cho | H04W 76/20 |
| 2018/0049159 | A1* | 2/2018 | Gu | H04W 72/005 |
| 2018/0139030 | A1* | 5/2018 | Kim | H04L 5/0042 |
| 2018/0139767 | A1* | 5/2018 | Lee | H04L 1/16 |
| 2018/0176769 | A1* | 6/2018 | Gupta | G06F 8/65 |
| 2018/0241489 | A1* | 8/2018 | Daoura | G08B 13/1427 |
| 2018/0288822 | A1* | 10/2018 | Lee | H04B 7/14 |
| 2019/0254072 | A1* | 8/2019 | Baron | H04W 74/0816 |
| 2019/0327665 | A1* | 10/2019 | Geng | H04W 48/10 |
| 2019/0364501 | A1* | 11/2019 | Kwon | H04W 72/042 |
| 2020/0028628 | A1* | 1/2020 | Lei | H04L 1/1819 |
| 2020/0059852 | A1* | 2/2020 | Urabayashi | H04J 11/0076 |
| 2020/0092685 | A1* | 3/2020 | Fehrenbach | H04B 7/2606 |
| 2020/0120639 | A1* | 4/2020 | Zuo | H04W 48/10 |
| 2020/0163047 | A1* | 5/2020 | Yoon | H04W 68/005 |
| 2020/0187253 | A1* | 6/2020 | Cui | H04W 72/0453 |

OTHER PUBLICATIONS

International Search Report and Written Opinion dated Sep. 10, 2018 for PCT/CN2018/093527 filed on Jun. 29, 2018, 9 pages including English Translation of the International Search Report.

Huawei, et al., "Discussion on NoMA study for Rel-15 SI", 3GPP TSG RAN WG1 NR Ad-Hoc Meeting R1-1711470, Qingdao, China, Jun. 27-30, 2017, 7 pages.

* cited by examiner

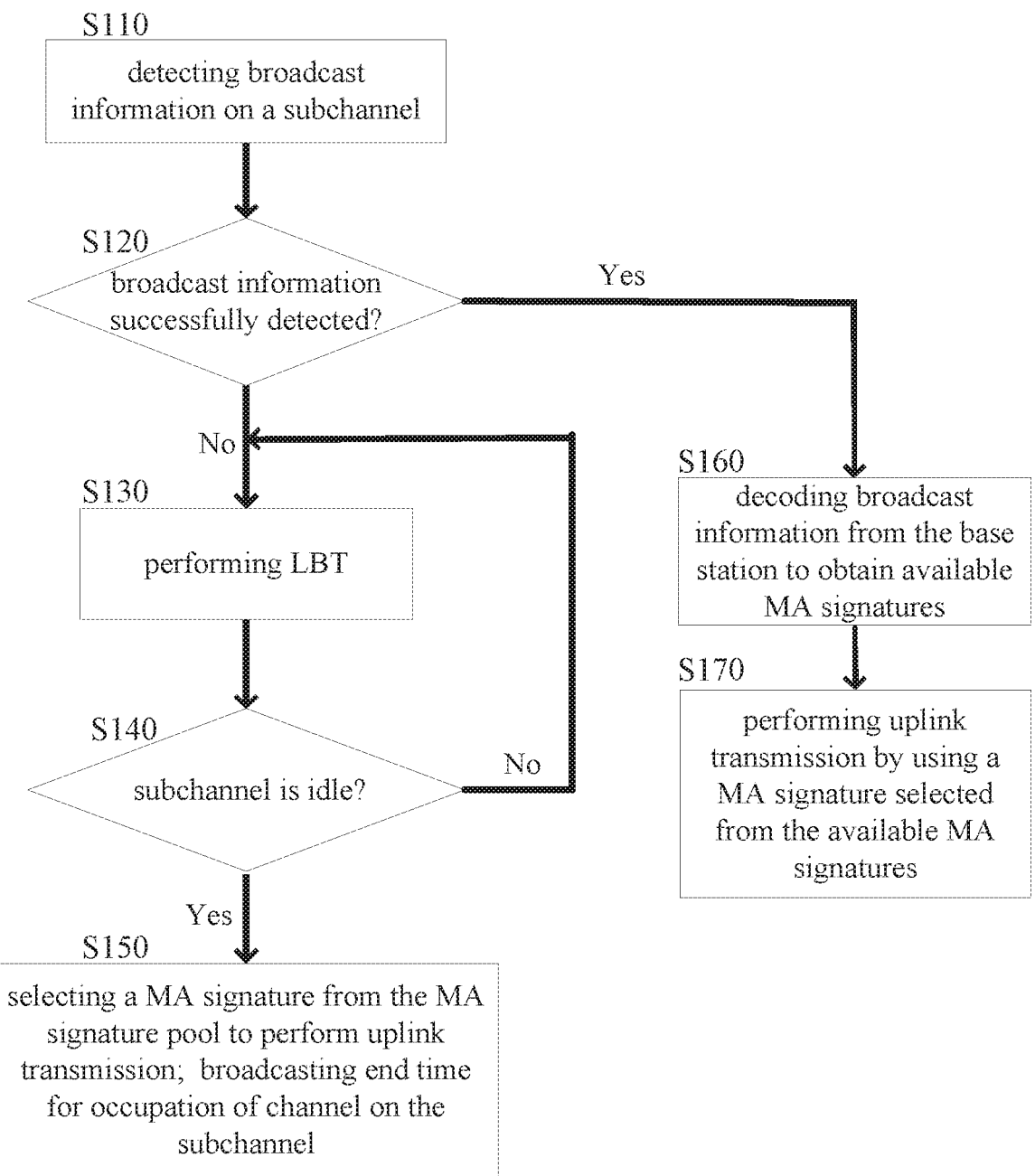

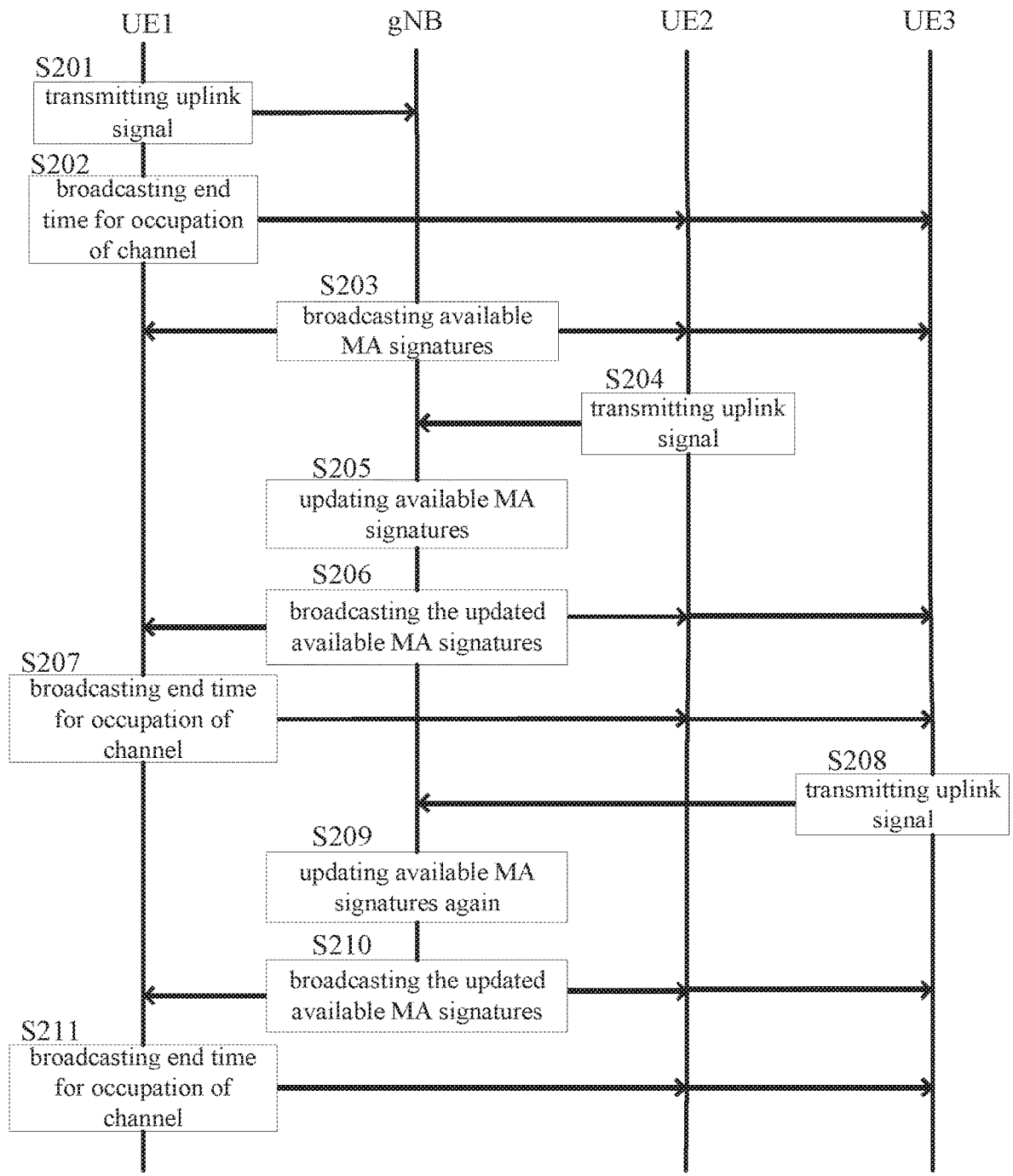

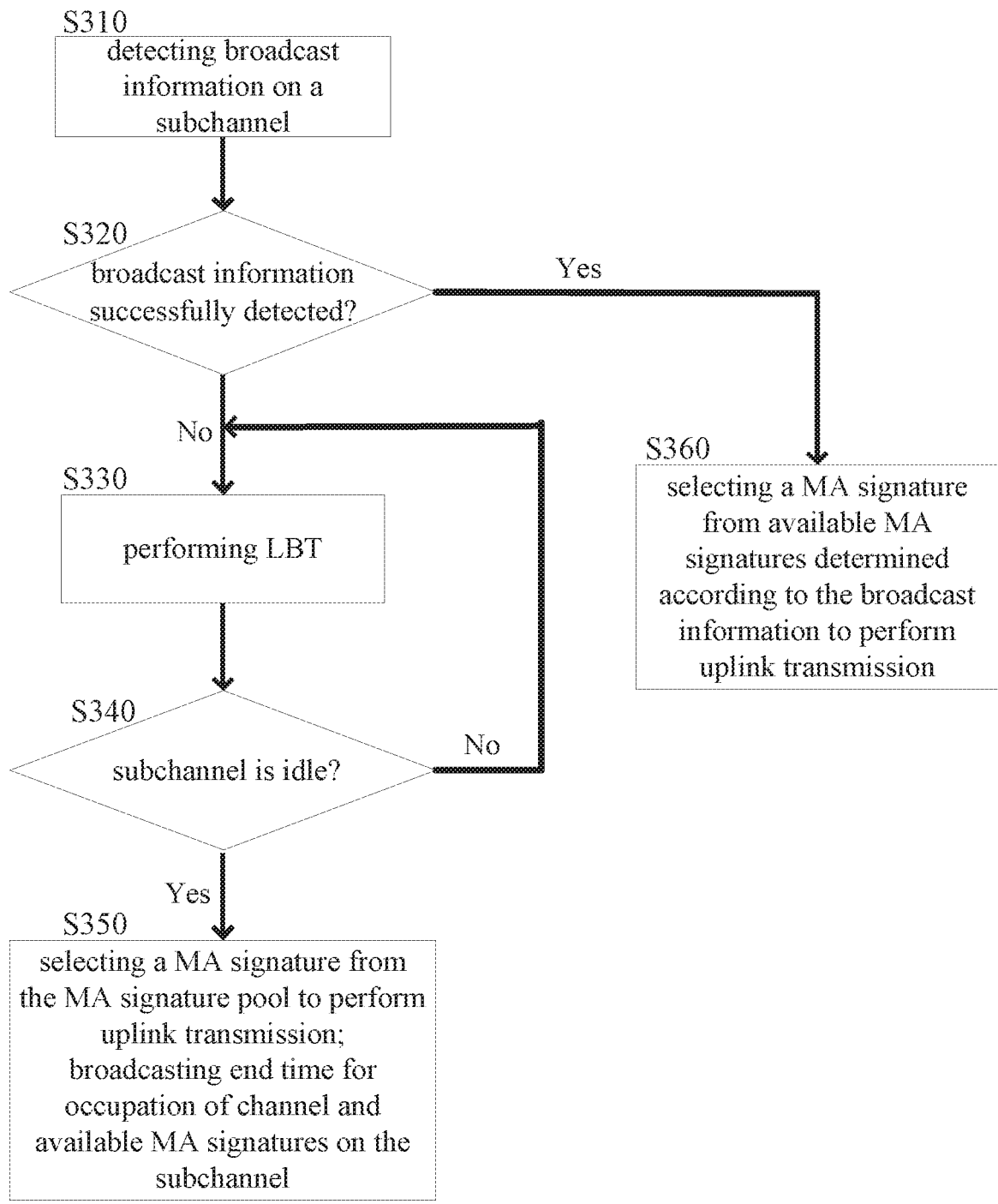

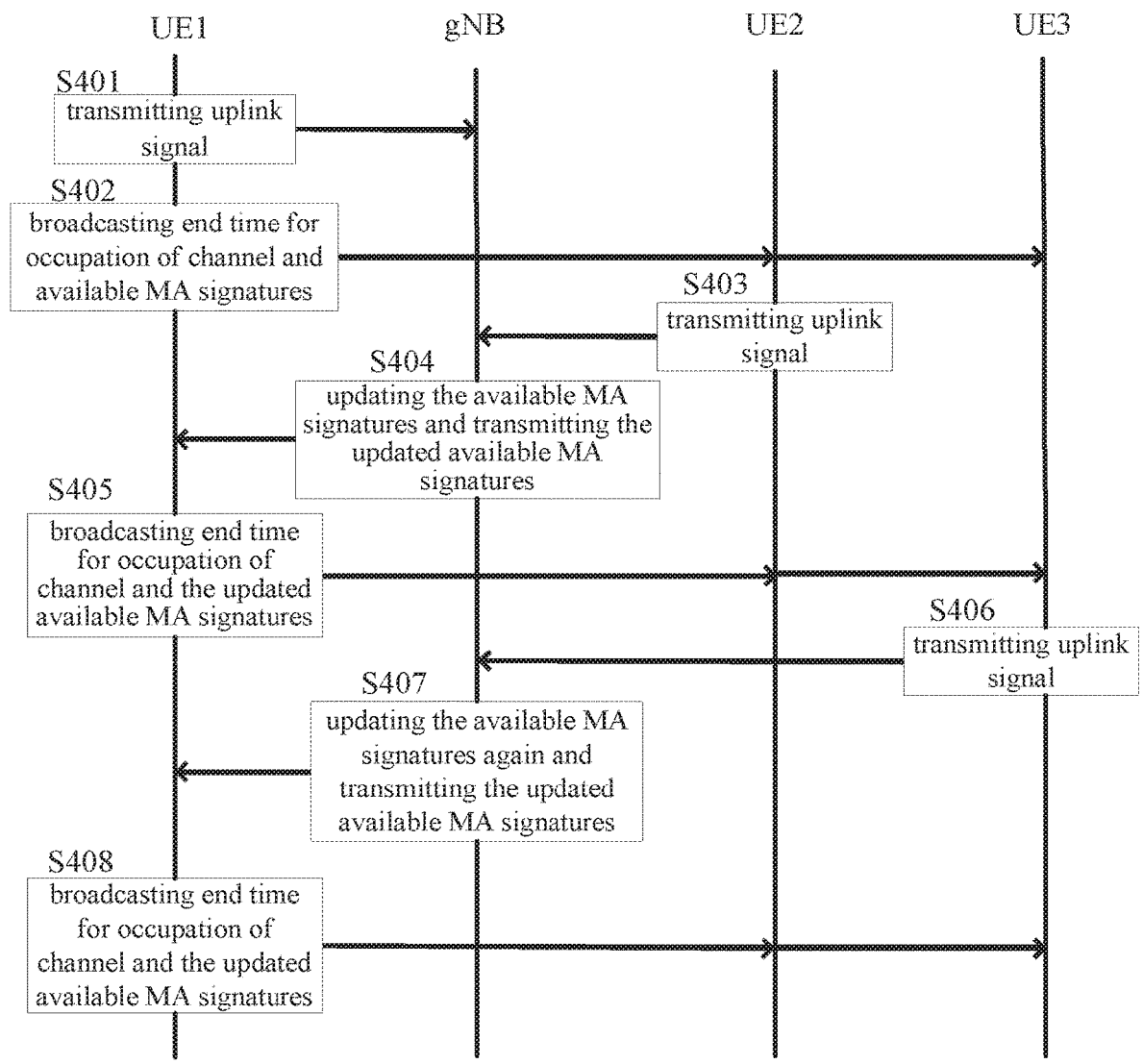

WIRELESS COMMUNICATION METHOD AND WIRELESS COMMUNICATION DEVICE

CROSS-REFERENCE TO RELATED APPLICATIONS

The present application is based on PCT filing PCT/CN2018/093527, filed Jun. 29, 2018, which claims priority to CN 201710546292.2, filed Jul. 6, 2017, the entire contents of each are incorporated herein by reference.

FIELD

The present disclosure relates to a wireless communication method and a wireless communication device, and in particular to a method and a device for implementing non-orthogonal multiple access in an unlicensed frequency band.

BACKGROUND

For the fifth generation (5G) wireless communication network, non-orthogonal multiple access (NOMA) technology is a very promising multiple access technology. With the conventional orthogonal multiple access (OMA) technology, one transmission resource (for example, a frequency resource or a time resource) may only be allocated to one user equipment, while with the NOMA technology, one resource may be allocated to multiple user equipments. The basic concept of the NOMA is that non-orthogonal transmission is performed at the transmitting end and interference information is introduced initiatively, and serial interference cancellation is performed at the receiving end to implement correct demodulation. Therefore, compared with the conventional OMA, the NOMA has a higher spectral efficiency and user fairness. In the NOMA, since different user equipments may use the same transmission resource, multiple access (MA) signatures are used at the transmitting end to distinguish the user equipments from one another, that is, each user equipment transmits signals by using a unique MA signature. The MA signature may be, for example, in the form of a codebook, a sequence, and the like.

For an uplink transmission in a licensed frequency band, the NOMA may be supported by 5G new radio (NR), that is, multiple user equipments may transmit uplink signals by using the same resource block. However, in the unlicensed frequency band, it is impossible to implement the NOMA in the uplink due to the current Listen Before Talk (LBT) mechanism.

Therefore, there is a demand for implementing the NOMA for an uplink transmission in an unlicensed frequency band.

SUMMARY

In view of the above, a technical solution with which an uplink non-orthogonal multiple access is implemented in an unlicensed frequency band is provided in the present disclosure.

According to an aspect of the present disclosure, a wireless communication device is provided, which includes a processing circuitry. The processing circuitry is configured to: detect broadcast information on a specific subchannel in an unlicensed frequency band; and broadcast time information on the specific subchannel when the broadcast information is not detected successfully, where an end time for occupation of the specific subchannel by the wireless communication device is determined according to the time information.

According to another aspect of the present disclosure, a wireless communication device is provided, which includes a processing circuitry. The processing circuitry is configured to: detect broadcast information on a specific subchannel in an unlicensed frequency band; and select, from one or more available resources in signature domain, one resource in signature domain to perform uplink transmission, when the broadcast information is successfully detected on the specific subchannel.

According to another aspect of the present disclosure, a wireless communication method performed by a terminal device is provided, which includes: detecting broadcast information on a specific subchannel in an unlicensed frequency band; and broadcasting time information on the specific subchannel when the broadcast information is not detected successfully, where an end time for occupation of the specific subchannel by the terminal device is determined according to the time information.

According to another aspect of the present disclosure, a wireless communication method performed by a terminal device is provided, which includes: detecting broadcast information on a specific subchannel in an unlicensed frequency band; and selecting, from one or more available resources in signature domain, one resource in signature domain to perform uplink transmission, when the broadcast information is successfully detected on the specific subchannel.

According to another aspect of the present disclosure, a wireless communication device is provided, which includes a processing circuitry. The processing circuitry is configured to: receive uplink transmission and time information on a specific subchannel in an unlicensed frequency band, where an end time for occupation of the specific subchannel by a specific terminal device is determined according to the time information; and update available resources in signature domain based on a resource in signature domain used by the uplink transmission, prior to the end time.

According to another aspect of the present disclosure, a wireless communication method performed by a base station is provided, which includes: receiving uplink transmission and time information on a specific subchannel in an unlicensed frequency band, where an end time for occupation of the specific subchannel by a specific terminal device is determined according to the time information; and updating available resources in signature domain based on a resource in signature domain used by the uplink transmission, prior to the end time.

According to another aspect of the present disclosure, a computer-readable storage medium storing a program is provided, where the program, when executed, causing a computer to implement the above-described wireless communication method.

BRIEF DESCRIPTION OF THE DRAWINGS

The present disclosure may be better understood with reference to the description given hereinafter in conjunction with the drawings, in which same or similar reference numerals are used to represent the same or similar components throughout the drawings. The drawings together with the following detailed description are included in this specification and form a part of this specification, and are intended to further illustrate the preferred embodiments of the present disclosure and to explain the principles and advantages of the present disclosure. In the drawings:

FIG. 1B is a flowchart of a process according to a first embodiment of the present disclosure;

FIG. 2 is a schematic diagram showing signaling interaction according to the first embodiment of the present disclosure.

FIG. 3 is a flowchart of a process according to a second embodiment of the present disclosure.

FIG. 4 is a schematic diagram showing signal interaction according to the second embodiment of the present disclosure;

DETAILED DESCRIPTION OF EMBODIMENTS

Figure 1A:
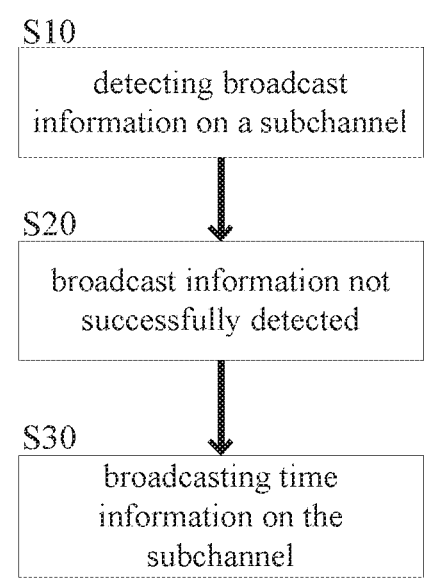
FIG. 1A is a general flowchart of a wireless communication method for an electronic device according to an embodiment of the present disclosure.

FIG. 1A schematically shows a process performed by a user equipment according to the present disclosure. As shown in FIG. 1A, when the uplink transmission data of the user equipment UE is ready, the user equipment UE detects broadcast information on one or more subchannels in an unlicensed frequency band in step S10. Then in step S20, for a certain subchannel, the user equipment UE determines that the broadcast information is not successfully detected. Herein, "the broadcast information is detected successfully" indicates a case where there is broadcast information on the subchannel and the user equipment successfully decodes the broadcast information, and "the broadcast information is not detected successfully" indicates a case where there is no broadcast information on the subchannel and a case where there is broadcast information on the subchannel but the user equipment cannot successfully decode the broadcast information. In the case that the user equipment UE does not successfully detect the broadcast information, the user equipment UE may determine, in step S30, that it is the first device accessing the subchannel and thus broadcast information on the subchannel. The broadcasted information includes an end time for occupation of the subchannel by the user equipment UE.

FIG. 1B shows a detailed process performed by a user equipment according to a first embodiment of the present disclosure. As shown in FIG. 1B, when the uplink transmission data of the user equipment UE is ready, the user equipment UE selects one or more subchannels in the unlicensed frequency band, and detects the broadcast information on the selected subchannels, as shown in step S110. As an example, the user equipment UE randomly selects one or more subchannels in the unlicensed frequency band. As another example, the subchannel is not selected by the user equipment UE, but semi-statically allocated to the user equipment UE by a base station.

In a case that the user equipment UE determines in step S120 that the broadcast information is not successfully detected on the subchannel, the user equipment may further determine whether the subchannel is idle, and the process proceeds to step S130.

In step S130, the user equipment UE performs "Listen Before Talk" (LBT) to determine whether the subchannel is idle. For example, the user equipment UE may determine whether the subchannel is idle by detecting signal energy on the subchannel. In a case that it is determined in step S140 that the subchannel is idle (for example, the signal energy is lower than a certain threshold), the process proceeds to step S150.

In step S150, the user equipment UE performs broadcasting on the subchannel, and the broadcasted information includes an end time for a time period during which the user equipment UE can occupy the subchannel. For example, the end time may be indicated by an end time point, an end subframe, an end symbol, or the like. As another example, the information broadcasted by the user equipment UE may include an access time and a maximum channel occupation time (MCOT) for the user equipment UE. Thus, other user equipments that receive the broadcast information may determine the end time for occupation of the subchannel by the user equipment UE according to the broadcast information. Furthermore, as described below in connection with FIG. 2, the user equipment UE may periodically broadcast the end time on the subchannel prior to the end time.

In addition, in step S150, the user equipment further selects a certain MA signature from a MA signature resource pool, and transmits a signal to the base station on the subchannel by using the selected MA signature. Specifically, the user equipment UE may arbitrarily select a MA signature from the MA signature resource pool to perform signal transmission.

On the other hand, in a case that the user equipment UE determines in step S140 that the subchannel is not idle (for example, the signal energy is higher than a certain threshold), it means that there is a signal transmitted by another user equipment on the subchannel. As an example, there may be a signal broadcasted by another user equipment on the subchannel that the user equipment UE cannot decode. Since the subchannel is already occupied by other user equipment, the user equipment UE cannot access the subchannel. Therefore, the process returns to step S130, and the user equipment UE continues to perform "Listen Before Talk" (LBT).

On the other hand, if the user equipment UE determines in step S120 that the broadcast information is successfully detected on the subchannel (including successfully decoding the broadcast information), although it means that another user equipment already occupies the subchannel, the user equipment UE may access the subchannel. Therefore, the process proceeds to step S160.

In step S160, the user equipment UE obtains the available MA signatures on the subchannel by decoding the broadcast information from the base station. For example, the base station may broadcast the available MA signatures on the subchannel in a licensed frequency band. Further, the base station may periodically broadcast the available MA signatures.

In step S170, the user equipment UE selects one MA signature from the obtained available MA signatures to perform uplink transmission on the subchannel.

In this embodiment, the user equipment UE, which is the first user equipment accessing a certain subchannel in the unlicensed frequency band, performs broadcasting. Any other user equipment that intends to access the subchannel may determine that it can access the subchannel when it successfully decodes the broadcast information of the user equipment UE. Subsequently, the other user equipment may perform uplink transmission on the subchannel by obtaining the MA signature from the base station, that is, the other user equipment shares the subchannel with the user equipment UE. In this way, uplink non-orthogonal multiple access in the unlicensed frequency band is realized. On the contrary, if the other user equipment that intends to access the subchannel cannot successfully decode the broadcast information of the user equipment UE, the other user equipment cannot access the subchannel, according to the conventional Listen Before Talk mechanism.

As an application example of the present disclosure, in a case that the subchannel is firstly occupied by the user equipment UE, the broadcast information transmitted by the user equipment UE may only be decoded by another user equipment belonging to the same system, thus the user equipment belonging to the same system as the user equipment UE may be allowed to access the subchannel and share the subchannel with the user equipment UE, thereby improving spectrum efficiency. Another user equipment belonging to a different system from the user equipment UE cannot access the subchannel because it cannot decode the broadcast signal. Furthermore, preferably, for the user equipments belonging to respective systems that intend to occupy the subchannel, the user equipments have uniform maximum channel occupation time so as to ensure fairness in coexistence of the respective systems. Further, for example, the systems herein may include an NR system and a WiFi system.

The maximum number of user equipments performing transmission on the same subchannel may be controlled by adjusting the broadcast power of the user equipment UE. The broadcast power may be determined based on a communication scenario. For example, in a large-scale machine type communication (mMTC) scenario, the broadcast power may be set to be higher so that more user equipments may share the same subchannel. In an ultra-high reliable low latency communication (URLLC) scenario, the broadcast power may be set to be lower to limit the number of user equipments sharing the subchannel, thereby ensuring the reliability of communication.

FIG. 2 is a diagram showing signaling interaction between a user equipment and a base station according to a first embodiment of the present disclosure. In FIG. 2, it is assumed that the user equipment UE1 is determined to be the first user equipment accessing a certain subchannel in the unlicensed frequency band according to the process in FIG. 1, and the user equipments UE2 and UE3 may access the subchannel following the user equipment UE1.

As shown in FIG. 2, the user equipment UE1 transmits an uplink signal to the base station gNB by using a certain MA signature on the subchannel after determining that it is the first user equipment occupying the subchannel, as shown in step S201. In addition, the user equipment UE1 performs broadcasting on the subchannel in step S202, and the broadcasted information includes the end time for occupation of the subchannel by the user equipment UE1. Alternatively, as described above, the broadcasted information may include the access time and maximum channel occupation time period of the user equipment UE1. It should be noted that steps S201 and S202 are not necessarily performed in the order shown in FIG. 2, but may be performed in a reverse order or simultaneously.

The base station gNB may obtain the MA signature used by the user equipment UE1 by receiving the uplink signal from the user equipment UE1, and the base station gNB determines the available MA signatures by excluding the MA signature used by the user equipment UE1 from the MA signature resource pool. The base station gNB broadcasts the determined available MA signatures to each user equipment in step S203.

In a case that the user equipment UE2 successfully detects the broadcast information of the user equipment UE1 and determines that it may access the subchannel, the user equipment UE2 obtains the available MA signatures on the subchannel by receiving the broadcast information from the base station, and selects one MA signature from the obtained available MA signatures to perform uplink transmission, as shown in step S204.

The base station gNB may obtain the MA signature used by the user equipment UE2 by receiving signal from the user equipment UE2, and update the available MA signatures by excluding the MA signature used by the user equipment UE2 from the available MA signatures, as shown in step S205. Subsequently, the base station gNB broadcasts the updated available MA signatures to each user equipment in step S206.

Prior to the end time for occupation of the user equipment UE1, the user equipment UE1 may periodically broadcast the end time on the subchannel, as shown in step S207.

Similarly to the user equipment UE2, in a case that the user equipment UE3 determines that it may access the subchannel, the user equipment UE3 obtains the current available MA signatures on the subchannel by decoding the broadcast information from the base station, and selects one MA signature from the available MA signatures to perform uplink transmission, as shown in step S208.

The base station gNB may determine the MA signature used by the user equipment UE3 by receiving signal from the user equipment UE3, and update the available MA signatures again by excluding the MA signature used by the user equipment UE3 from the available MA signatures, as shown in step S209. Subsequently, the base station gNB broadcasts the updated available MA signatures to each user equipment in step S210.

Preferably, in steps S203, S206 and S210, the base station gNB may broadcast the MA signatures available on the subchannel in a licensed frequency band, for example, via Physical Broadcast Channel (PBCH). With broadcasting the available MA signatures by the base station gNB, the collisions among MA signatures of the user equipments can be reduced, and the complexity of the receiver can be reduced.

Furthermore, since the user equipment UE1 periodically broadcasts the end time for occupation on the subchannel, it is indicated in step S211 that the user equipment UE1 broadcasts the end time again.

In this embodiment, the user equipment UE1 may periodically broadcast the end time for occupation of the channel, and the base station gNB may periodically update the available MA signatures and broadcast the updated available MA signatures to each user equipment. The periodic operations of the user equipment UE1 and the base station gNB are independent from each other, and may have different periodicities. For example, although FIG. 2 shows that the user equipment UE1 broadcasts the end time for occupation again (step S207) after the base station broadcasts the updated available MA signatures (step S206), the present disclosure is not limited thereto. That is, step S207 and the step performed by the base station gNB are performed in a random order. The temporal relationship between the periodic broadcasting of the user equipment UE1 and the periodic updating of the base station gNB is not limited in the present disclosure.

In addition, it should be noted that although FIG. 2 shows the base station gNB updates the available MA signatures each time receiving the uplink signals from the user equipments (UE2, UE3), the present disclosure is not limited thereto. In an actual communication system, since the base station gNB may receive a large number of uplink signals in a very short time period, the base station gNB may not update the available MA signatures for each reception of an uplink signal, and instead updates the available MA signatures with a longer periodicity.

FIG. 3 shows a process performed by a user equipment according to a second embodiment of the present disclosure. As shown in FIG. 3, when the uplink transmission data is ready, the user equipment UE selects one or more subchannels in the unlicensed frequency band, and detects broadcast information on the selected subchannels, as shown in step S310. Specifically, the user equipment UE may randomly select a subchannel, or the base station may semi-statically allocate a subchannel to the user equipment UE.

In a case that the user equipment UE determines in step S320 that the broadcast information is not successfully detected on the subchannel, the user equipment may further determine whether the subchannel is idle. Therefore, the process proceeds to step S330.

In step S330, the user equipment UE performs "Listen Before Talk" to determine whether the subchannel is idle. Similarly to the first embodiment, for example, the user equipment UE may determine whether the subchannel is idle by detecting signal energy on the subchannel. In a case that it is determined in step S340 that the subchannel is idle (for example, the signal energy is lower than a certain threshold), the process of the user equipment UE proceeds to step S350.

In step S350, the user equipment UE performs broadcasting on the subchannel, and the broadcasted information may include an end time for occupation of the subchannel by the user equipment UE, or an access time and a maximum channel occupation time of the user equipment UE. In addition, the user equipment UE selects a certain MA signature from the MA signature pool, and performs uplink transmission on the subchannel with the selected MA signature. Specifically, since the user equipment UE is the first user equipment accessing the subchannel, the user equipment UE may arbitrarily select a MA signature from the MA signature pool. The process is the same as that in the first embodiment.

The difference between this embodiment and the first embodiment is that the user equipment UE, which is the first user equipment accessing the subchannel, further broadcasts the current available MA signatures on the subchannel in step S350, and the current available MA signatures may be obtained by excluding the MA signature selected by the user equipment UE from the MA signature pool. Alternatively, as described later in connection with FIG. 4, the available MA signatures may be notified by the base station. In this case, the base station periodically updates the available MA signatures and notifies the user equipment UE of the updated signature, and the user equipment UE periodically broadcasts the current available MA signatures on the subchannel.

On the other hand, in a case that the user equipment UE determines in step S340 that the subchannel is not idle (for example, the signal energy is higher than a certain threshold), it means that there is a signal transmitted by another user equipment on the subchannel. As an example, there may be a signal broadcasted by another user equipment on the subchannel that the user equipment UE cannot decode. Since the subchannel is already occupied by the other user equipment, the user equipment UE cannot access the subchannel. Therefore, the process returns to step S330, and the user equipment UE continues to perform "Listen Before Talk".

On the other hand, if the user equipment UE determines in step S320 that the broadcast information is successfully detected (decoded) on the subchannel, although it means that another user equipment already performs transmission on the subchannel, the user equipment UE determines that it can also access the subchannel. Therefore, the process proceeds to step S360.

Since the broadcast information includes the available MA signatures on the subchannel, the user equipment UE may obtain the current available MA signatures by decoding the broadcast information. As such, in step S360, the user equipment UE selects one MA signature from the obtained available MA signatures to perform uplink transmission.

Similarly to the first embodiment, in this embodiment, the user equipment UE, which is the first user equipment occupying the subchannel, performs broadcasting on the subchannel, and any other user equipment that intends to access the subchannel can access the subchannel if it successfully decodes the broadcast information of the user equipment UE, that is, the other user equipment can share the subchannel with the user equipment UE. Therefore, the uplink non-orthogonal multiple access in the unlicensed frequency band is realized. On the contrary, any other user equipment that intends to access the subchannel cannot access the subchannel if it cannot successfully decode the broadcast information.

FIG. 4 shows a diagram of signaling interaction between a user equipment and a base station according to a second embodiment of the present disclosure. In FIG. 4, it is assumed that the user equipment UE1 is the first user equipment occupying a certain subchannel in the unlicensed frequency band, and the user equipments UE2 and UE3 may access the subchannel following the user equipment UE1.

As shown in FIG. 4, the user equipment UE1, which is the first user equipment occupying the subchannel, transmits an uplink signal to the base station gNB by using the MA signature selected from the MA signature resource pool in step S401. In addition, the user equipment UE1 performs broadcasting on the subchannel in step S402, the broadcasted information includes the end time for occupation of the user equipment UE1 and MA signatures available on the subchannel. The broadcasted available MA signatures are determined by the user equipment UE1 by excluding the selected MA signature from the MA signature resource pool. It should be noted that steps S401 and S402 are not necessarily performed in the order shown in FIG. 4, but may be performed in a reverse order or simultaneously.

The base station gNB may determine the MA signature used by the user equipment UE1 by receiving uplink signal from the user equipment UE1. Therefore, even if the base station gNB does not receive the broadcast information of the user equipment UE1 on the subchannel, the base station gNB may determine the available MA signatures by excluding the MA signature used by the user equipment UE1 from the MA signature resource pool.

Subsequently, the user equipment UE2 obtains the available MA signatures by decoding the broadcast information of the user equipment UE1, and selects one MA signature from the obtained available MA signatures to perform uplink transmission, as shown in step S403.

The base station gNB obtains the MA signature used by the user equipment UE2 by receiving signal from the user equipment UE2, updates the available MA signatures by excluding the MA signature used by the user equipment UE2 from the previously determined available MA signatures, and transmits the updated available MA signatures to the user equipment UE1, as shown in step S404.

After receiving the updated available MA signatures from the base station gNB, the user equipment UE1 may broadcast information again on the subchannel, as shown in step S405. Preferably, the user equipment UE1 may broadcast both the updated available MA signatures and the end time for occupation.

Subsequently, similarly to the user equipment UE2, the user equipment UE3 obtains the available MA signatures by decoding the broadcast information of the user equipment UE1, and selects one MA signature from the available MA signatures to transmit an uplink signal to the base station gNB, as shown in step S406.

The base station gNB determines the MA signature used by the user equipment UE3 by receiving signal from the user equipment UE3, updates the available MA signatures again by excluding the MA signature used by the user equipment UE3 from the available MA signatures, and transmits the updated MA signatures to the user equipment UE1, as shown in step S407. Preferably, in steps S404 and S407, the base station gNB may transmit the updated available MA signatures in a licensed frequency band, for example, via Physical Downlink Control Channel (PDCCH).

After receiving the updated available MA signatures from the base station gNB, the user equipment UE1 broadcasts the received available MA signatures again in step S408. Preferably, the user equipment UE1 broadcasts both the available MA signatures and the end time for occupation.

It should be noted that although FIG. 4 shows the base station gNB updates the available MA signatures each time receiving the uplink signals from the user equipments (UE2, UE3), the present disclosure is not limited thereto. The base station gNB may not update the available MA signatures for each uplink transmission, and instead updates the available MA signatures with a longer periodicity (for example, multiple uplink transmissions may be received during this periodicity).

Further, although FIG. 4 shows that the user equipment UE1 performs broadcasting each time receiving the updated available MA signatures transmitted by the base station gNB, the present disclosure is not limited thereto. In the present disclosure, the periodic broadcasting of the user equipment UE1 and the periodic updating of the MA signatures by the base station gNB may be independent from each other. The broadcast periodicity of the user equipment UE1 may be longer or shorter than the update periodicity of the base station. For example, the user equipment UE1 may receive the updated available MA signatures twice and broadcast the available MA signatures received in the second time.

According to the embodiments described above, a technical solution for implementing uplink non-orthogonal multiple access (NOMA) in an unlicensed frequency band is provided according to the present disclosure. With the present disclosure, the spectral efficiency is improved, and fair coexistence of respective systems in an unlicensed frequency band is ensured. In the above, NR system and WiFi system are taken as examples of the systems, but the present disclosure is not limited to the NR system and the WiFi system. With the development of technology, those skilled in the art may readily appreciate the application of the present disclosure to other systems.

Furthermore, the present disclosure may also be applied to uplink grant-free transmission. The uplink grant-free transmission refers to that the uplink transmission may be performed immediately after the data of a user equipment is ready, without transmitting a scheduling request to a base station and waiting for receiving an uplink scheduling grant from the base station. The uplink grant-free transmission has an advantage that signaling overhead related to the scheduling request and the uplink scheduling grant may be reduced (the advantage is significant especially when the amount of data to be transmitted is small), and the transmission delay caused by the scheduling request and the uplink scheduling grant may be reduced.

The present disclosure may be applied to various products. For example, the base station in the above-described embodiments may include a 5G base station (gNB) and a 4G base station (eNB) such as a macro eNB and a small eNB. The small eNB may be an eNB that covers a cell smaller than a macro cell, such as pico eNB, micro eNB and home (femto) eNB. Alternatively, the network side device or the base station further may include any other type of base station, such as Node B and base transceiver station (BTS). The base station may include a main body (that is also referred to as a base station apparatus) configured to control wireless communication, and one or more remote radio heads (RRH) disposed in a different place from the main body. Further, various types of terminals may also function as a base station by performing the function of the base station temporarily or semi-permanently.

In another aspect, the user equipment in the above-described embodiments may be implemented as a communication terminal device (such as smart phone, panel personal computer (PC), notebook PC, portable game terminal, portable/dongle mobile router and digital camera) or an on-board terminal device (such as car navigation device). The terminal device or the user equipment may also be implemented as a terminal device for performing machine to machine (M2M) communication, which is also referred to as a machine-type communication (MTC) terminal device. Further, the terminal device or the user equipment may be a wireless communication module mounted on each of the above terminals (such as integrated circuit module including a single chip).

The implementation of the user equipment is described below by taking a smart phone as an example in conjunction with FIG. 5.

Figure 5:
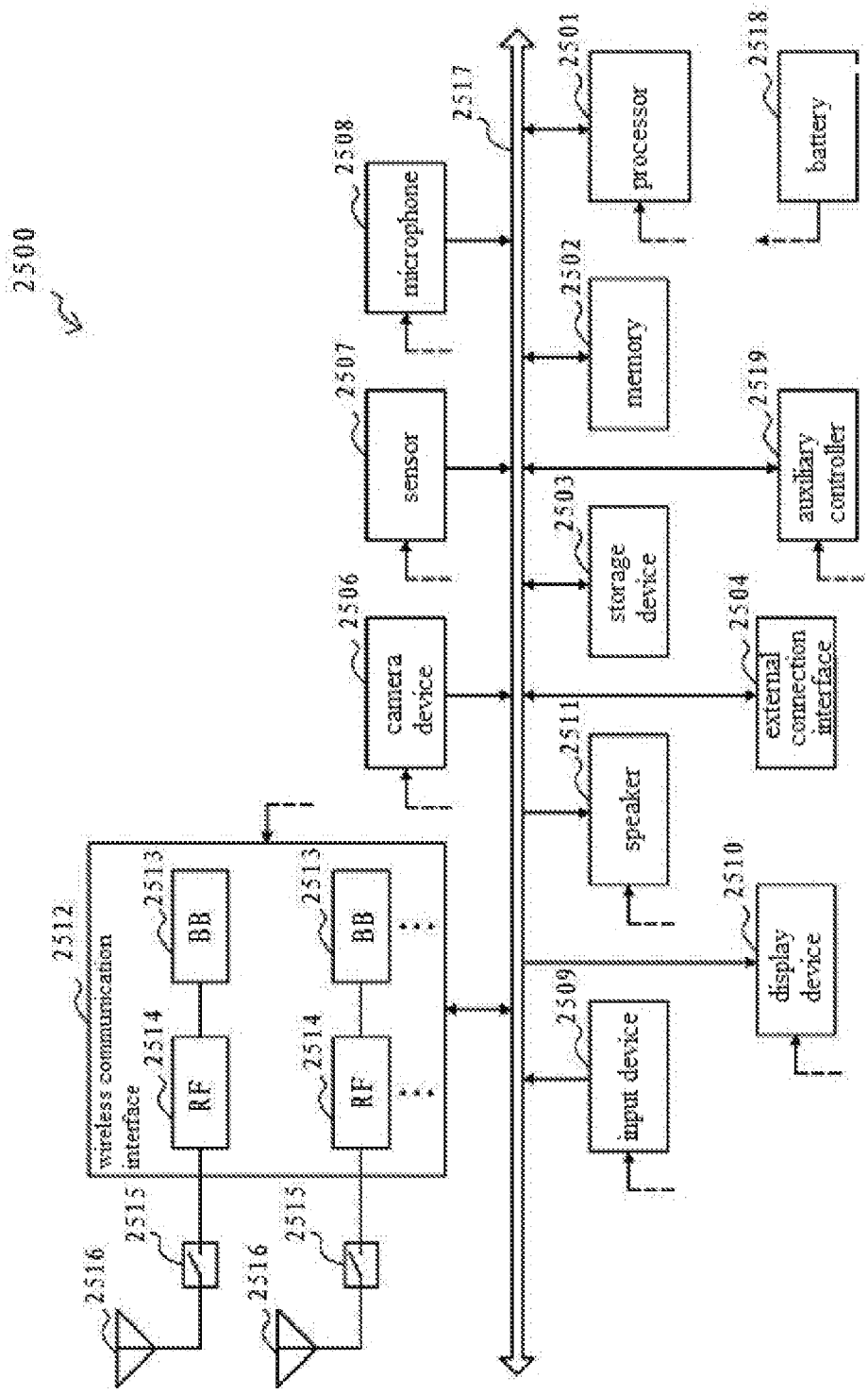
FIG. 5 is a schematic block diagram of an exemplary configuration of a user equipment.

FIG. 5 shows a block diagram of a schematic configuration of a smart phone. The smart phone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, CPU or System on Chip (SoC), and controls functions of an application layer and another layer of the smartphone 2500. The memory 2502 includes RAM and ROM, and stores a program that is executed by the processor 2501, and data. The storage device 2503 may include a storage medium such as a semiconductor memory and a hard disk. The external connection interface 2504 is an interface for connecting an external device (such as a memory card and a universal serial bus (USB) device) to the smart phone 2500.

The camera device 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input device 2509 includes, for example, a touch sensor configured to detect touch onto a screen of the display device 2510, a keypad, a keyboard, a button, or a switch, and receive an operation or information inputted from a user. The display device 2510 includes a screen such as a liquid crystal display (LCD) and an organic light-emitting diode (OLED) display, and displays an output image of the smart phone 2500. The speaker 2511 converts audio signals that are outputted from the smartphone 2500 to sounds.

The wireless communication interface 2512 supports any cellular communication scheme (such as LET and LTE-Advanced), and performs wireless communication. The wireless communication interface 2512 may typically include, for example, a base band (BB) processor 2513 and a radio frequency (RF) circuit 2514. The BB processor 2513 may perform for example coding/decoding, modulation/demodulation and multiplexing/de-multiplexing, and perform various types of signal processes for wireless communication. The RF circuit 2514 may include a mixer, a filter and an amplifier for example, and transmits and receives a wireless signal via the antenna 2516. The wireless communication interface 2512 may be a chip module with the BB processor 2513 and the RF circuit 2514 integrated therein. The wireless communication interface 2512 may include multiple BB processors 2513 and multiple RF circuits 2514, as shown in FIG. 5. However, the wireless communication interface 2512 may also include a single BB processor 2513 or a single RF circuit 2514.

Furthermore, in addition to a cellular communication scheme, the wireless communication interface 2512 may support another type of wireless communication scheme such as a short-distance wireless communication scheme, a near field communication scheme, and a wireless local area network (LAN) scheme. In that case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive wireless signals. The smartphone 2500 may include the multiple antennas 2516, as shown in FIG. 5. However, the smart phone 2500 may include a single antenna 2516.

In addition, the smart phone 2500 may include an antenna 2516 for each wireless communication scheme. In this case, the antenna switch 2515 may be omitted in the configuration of the smart phone 2500.

The bus 2517 connects the processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 to each other. The battery 2518 supplies power to respective components of the smart phone 2500 via feeders which are partially shown with dotted lines in FIG. 5. The auxiliary controller 2519 operates a minimum necessary function of the smart phone 2500, for example, in a sleep mode.

In the smart phone 2500 as shown in FIG. 5, a transceiving device of the terminal device may be implemented as the wireless communication interface 2512. At least a part of the functions of respective functional units of the terminal device may also be implemented as the processor 2501 or the auxiliary controller 2519. For example, when the auxiliary controller 2519 performs a part of functions of the processor 2501, the power consumption of the battery 2518 can be reduced. In addition, the processor 2501 or the auxiliary controller 2519 may perform at least a part of the functions of respective functional units of the terminal device by executing programs stored in the memory 2502 or the storage device 2503.

The implementation of the based station is described below in connection with FIG. 6.

Figure 6:
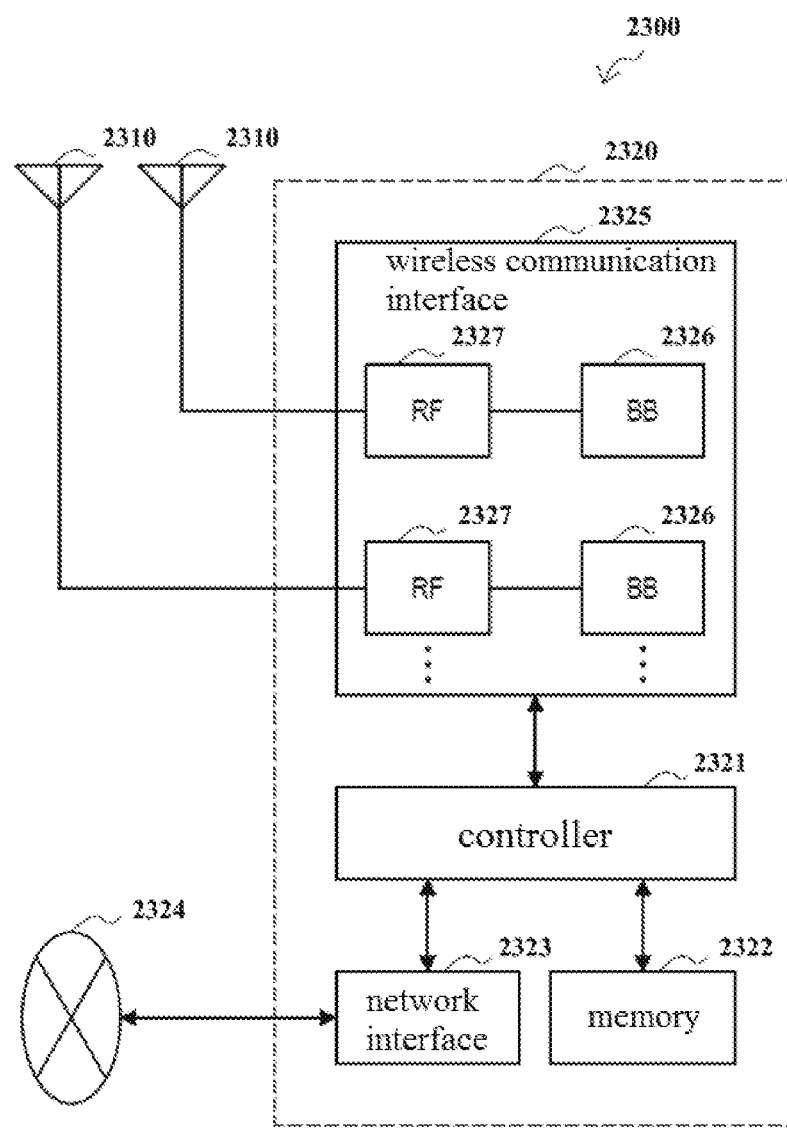
FIG. 6 is a schematic block diagram of an exemplary configuration of a base station.

FIG. 6 shows a block diagram of a schematic configuration of a base station. As shown in FIG. 6, the base station 2300 includes one or multiple antennas 2310 and a base station device 2320. Each antenna 2310 and the base station apparatus 2320 may be connected to each other via a radio frequency (RF) cable.

Each of the antennas 2310 includes one or multiple antenna elements (such as multiple antenna elements included in a multiple-input multiple-output (MIMO) antenna), and is used for transmitting and receiving a wireless signal by the base station device 2320. The base station 2300 may include the multiple antennas 2310, as shown in FIG. 6. For example, the multiple antennas 2310 may be compatible with multiple frequency bands used by the base station 2300. The base station 2300 may also include a single antenna 2310, although FIG. 6 shows an example that the base station 2300 includes multiple antennas 2310.

The base station device 2320 includes a controller 2321, a memory 2322, a network interface 2323 and a wireless communication interface 2325.

The controller 2321 may be a CPU or a DSP and control various functions of higher layers of the base station device 2320. For example, the controller 2321 generates a data packet based on data in a signal processed by the wireless communication interface 2325, and transfers the generated packet via a network interface 2323. The controller 2321 may bundle data from multiple baseband processors to generate bundled packet, and transfer the generated bundled packet. The controller 2321 may have logic functions for performing the following control: radio resource control, radio carrying control, mobility management, admission control and schedule. The control may be performed in conjunction with an adjacent base station or a core network node. The memory 2322 includes RAM and ROM, and stores programs executed by the controller 2321 and various types of control data (such as a terminal list, transmission power data and scheduling data).

The network interface 2323 is configured to connect the base station device 2320 to a communication interface of the core network 2324. The controller 2321 may communicate with the core network node or another base station via the network interface 2323. In this case, the base station 2300 and the core network node or another base station may be connected to each other via a logic interface (such as an Si interface and an X2 interface). The network interface 2323 may be a wired communication interface or a wireless communication interface for a wireless backhaul line. If the network interface 2323 is a wireless communication interface, the network interface 2323 may use a higher frequency band for wireless communication than that used by the wireless communication interface 2325.

The wireless communication interface 2325 supports any cellular communication scheme (such as Long Term Evolution (LTE) and LTE-Advanced), and provides wireless connection to a terminal positioned in a cell of the base station 2300 via the antenna 2310. The wireless communication interface 2325 may include, for example, a BB processor 2326 and an RF circuit 2327. The BB processor 2326 may perform for example coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 2321, the BB processor 2326 may have a part or all of the above logic functions. The BB processor 2326 may be a memory storing communication control programs, or a module including a processor and a related circuit which are configured to execute programs. Updating the program may allow the functions of the BB processor 2326 to be changed. The module may be a card or a blade inserted into a slot of the base station device 2320. Alternatively, the module may be a chip installed on the card or the blade. In addition, the RF circuit 2327 may include for example a mixer, a filter or an amplifier, and transmits and receives a wireless signal via the antenna 2310.

As shown in FIG. 6, the wireless communication interface 2325 may include multiple BB processors 2326. For example, the multiple BB processors 2326 may be compatible with multiple frequency bands used by the base station 2300. The wireless communication interface 2325 may include multiple RF circuits 2327, as shown in FIG. 6. For example, the multiple RF circuits 2327 may be compatible with multiple antenna elements. Although FIG. 6 illustrates the example in which the wireless communication interface 2325 includes the multiple BB processors 2326 and the multiple RF circuits 2327, the wireless communication interface 2325 may also include a single BB processor 2326 or a single RF circuit 2327.

In the base station 2300 shown in FIG. 6, a transceiving device of the base station side device may be implemented as the wireless communication interface 2325. At least a part of the functions of respective units may be performed by the controller 2321. For example, the controller 2321 may perform at least a part of the functions of respective units by executing programs stored in the memory 2322.

Various devices or units described herein are merely logical in nature and do not strictly correspond to physical devices or entities. For example, the functionality of each unit described herein may be implemented by multiple physical entities or the functionality of multiple units described herein may be implemented by a single physical entity. In addition, it should be noted that features, components, elements or steps, and the like described in an embodiment are not limited to this embodiment, but may also be applied to other embodiments, for example, may substitute for specific features, components, elements, or steps, and the like in other embodiments or may be combined with them.

Figure 7:
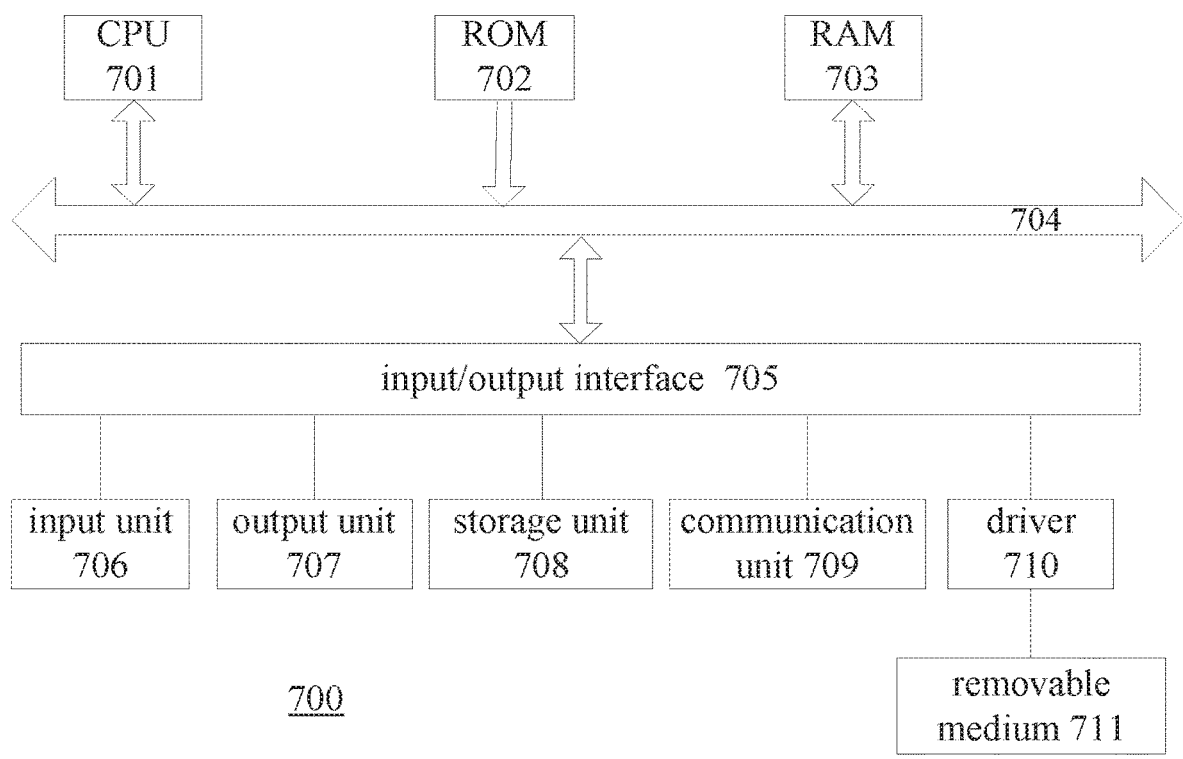
FIG. 7 is a schematic block diagram of an exemplary configuration of a computer hardware.

FIG. 7 is a block diagram showing an exemplary configuration of computer hardware that executes the scheme of the present disclosure based on a program.

In a computer 700, a central processing unit (CPU) 701, a read only memory (ROM) 702, and a random access memory (RAM) 703 are connected to each other via a bus 704.

An input/output interface 705 is further connected to the bus 704. The input/output interface 705 is connected with the following components: an input unit 706 including a keyboard, a mouse, a microphone, and the like; an output unit 707 including a display, a speaker and the like; a storage unit 708 including a hard disk, a nonvolatile memory or the like; a communication unit 709 including a network interface card (such as a local area network (LAN) card, a modem); and a driver 710 that drives a removable medium 711 such as a magnetic disk, an optical disk, a magneto-optical disk, or a semiconductor memory.

In the computer having the above structure, the CPU 701 loads the programs stored in the storage unit 708 into the RAM 703 via the input/output interface 705 and the bus 704, and executes the programs to perform the above series of processing.

A program to be executed by the computer (CPU 701) may be recorded on the removable medium 711 as a package medium including a magnetic disk (including a floppy disk), an optical disk (including compact disk-read only memory (CD-ROM)), a digital versatile disk (DVD), and the like), a magneto-optical disk, or a semiconductor memory, and the like. Alternatively, the programs to be executed by the computer (CPU 701) may also be provided via wired or wireless transmission medium such as LAN, the Internet or digital satellite broadcasting.

In a case where the removable medium 711 is installed in the driver 710, the program may be installed in the storage unit 708 via the input/output interface 705. In addition, the program may be received by the communication unit 709 via a wired or wireless transmission medium, and then the program may be installed in the storage unit 708. Alternatively, the programs can be previously loaded into the ROM 702 or the storage unit 708.

The program to be executed by the computer may be a program that executes the process according to the order described in the present specification or may be a program that executes the process in parallel or executes the process when needed (for example, when called).

The embodiments and the technical effects of the present disclosure have been described above in detail in conjunction with the drawings, but the scope of the present disclosure is not limited thereto. It should be understood by those skill in the art that various modifications or changes in the embodiments discussed herein can be made without departing from the spirit and principle of the present disclosure, depending on design requirements and other factors. The scope of the present disclosure is defined by the appended claims or their equivalents.

In addition, the present disclosure may also be configured as follows.

A wireless communication device is provided, which includes a processing circuitry configured to: detect broadcast information on a specific subchannel in an unlicensed frequency band; and broadcast time information on the specific subchannel when the broadcast information is not detected successfully, where an end time for occupation of the specific subchannel by the wireless communication device is determined according to the time information.

The processing circuitry is further configured to: select a resource in signature domain to perform uplink transmission on the specific subchannel when the broadcast information is not detected successfully.

The processing circuit is further configured to: detect signal energy on the specific subchannel to determine whether the specific subchannel is idle, when the broadcast information is not detected successfully; and broadcast the time information and perform uplink transmission using the selected resource in signature domain, when the specific subchannel is determined to be idle.

The broadcasting the time information includes: periodically broadcasting the time information until the end time indicated by the time information.

The processing circuit is further configured to: determine available resources in signature domain by excluding the selected resource in signature domain from a signature domain resource pool; and broadcast the available resources in signature domain.

The processing circuitry is further configured to: prior to the end time indicated by the time information, receive updated available resources in signature domain from a base station; and broadcast the updated available resources in signature domain.

A wireless communication device is provided, which includes a processing circuitry configured to: detect broadcast information on a specific subchannel in unlicensed frequency band; select, from one or more available resources in signature domain, one resource in signature domain to perform uplink transmission, when the broadcast information is successfully detected on the specific subchannel.

The processing circuitry is further configured to: acquire, from a base station, the one or more available resources in signature domain, or determine the one or more available resources in signature domain based on the broadcast information.

A wireless communication method performed by a terminal device is provided, which includes: detecting broadcast information on a specific subchannel in an unlicensed frequency band; and broadcasting time information on the specific subchannel when the broadcast information is not detected successfully, where an end time for occupation of the specific subchannel by the terminal device is determined according to the time information.

The method further includes: selecting a resource in signature domain to perform uplink transmission on the specific subchannel, when the broadcast information is not detected successfully.

The method further includes: detecting signal energy on the specific subchannel to determine whether the specific subchannel is idle, when the broadcast information is not detected successfully; and broadcasting the time information and performing uplink transmission by using the selected resource in signature domain, when the specific subchannel is determined to be idle.

The method further includes: periodically broadcasting the time information until the end time indicated by the time information.

The method further includes: determining available resources in signature domain by excluding the selected resource in signature domain from a signature domain resource pool; and broadcasting the available resources in signature domain.

The method further includes: prior to the end time indicated by the time information, receiving the updated available resources in signature domain from a base station; and broadcasting the updated available resources in signature domain.

A wireless communication method performed by a terminal device is provided, which includes: detecting broadcast information on a specific subchannel in an unlicensed frequency band; selecting, from one or more available resources in signature domain, one resource in signature domain to perform uplink transmission, when the broadcast information is successfully detected on the specific subchannel.

The method further includes: acquiring, from a base station, the one or more available resources in signature domain, or determining the one or more available resources in signature domain based on the broadcast information.

A wireless communication device is provided, which includes a processing circuitry configured to: receive uplink transmission and time information on a specific subchannel in an unlicensed frequency band, where an end time for occupation of the specific subchannel by a specific terminal device is determined according to the time information; update available resources in signature domain based on a resource in signature domain used by the uplink transmission, prior to the end time.

The processing circuitry is further configured to: determine updated available resources in signature domain by excluding the resource in signature domain used by the uplink transmission from a signature domain resource pool.

The processing circuitry is further configured to: broadcast the updated available resources in signature domain in a licensed frequency band prior to the end time.

The processing circuitry is further configured to: transmit the updated available resources in signature domain to the specific terminal device in the licensed frequency band prior to the end time.

A wireless communication method performed by a base station is provided, which includes: receiving uplink transmission and time information on a specific subchannel in an unlicensed frequency band, where an end time for occupation of the specific subchannel by a specific terminal device is determined according to the time information; updating available resources in signature domain based on a resource in signature domain used by the uplink transmission, prior to the end time.

The method further includes: determining the updated available resources in signature domain by excluding the resource in signature domain used by the uplink transmission from a signature domain resource pool.

The method further includes: broadcasting the updated available resources in signature domain in a licensed frequency band prior to the end time.

The method further includes: transmitting the updated available resources in signature domain to the specific terminal device in the licensed frequency band prior to the end time.

A computer readable storage medium is provided, which stores a program. The program, when executed, causing a computer to implement the above-described wireless communication method.

The invention claimed is:

1. A wireless communication device, comprising a processing circuitry configured to:
    initiate detection of broadcast information on a specific subchannel in an unlicensed frequency band;
    select a resource in a domain to perform uplink transmission on the specific subchannel when the broadcast information is not detected successfully;
    detect signal energy on the specific subchannel to determine whether the specific subchannel is idle when the broadcast information is not detected successfully; and
    broadcast time information and perform uplink transmission using the selected resource in the domain when the specific subchannel is determined to be idle,
    wherein an end time for occupation of the specific subchannel by the wireless communication device is determined according to the time information.

2. The wireless communication device according to claim 1, wherein the broadcasting the time information comprises: periodically broadcasting the time information until the end time indicated by the time information.

3. The wireless communication device according to claim 1, wherein the processing circuit is further configured to:
- determine available resources in a domain by excluding the selected resource in the domain from a domain resource pool; and
- broadcast the available resources in the domain.

4. The wireless communication device according to claim 3, wherein the processing circuitry is further configured to:
- prior to the end time indicated by the time information, receive updated available resources in the domain from a base station; and
- broadcast the updated available resources in the domain.

5. A wireless communication device, comprising a processing circuitry configured to:
- initiate detection of broadcast information on a specific subchannel in an unlicensed frequency band;
- in a case when the broadcast information is successfully detected on the specific subchannel: select, from one or more available resources in a domain, one resource in the domain to perform uplink transmission; and
- in a case when the broadcast information is not successfully detected on the specific subchannel: select a resource in the domain to perform uplink transmission on the specific subchannel, detect signal energy on the specific subchannel to determine whether the specific subchannel is idle, and broadcast time information and perform uplink transmission using the selected resource in the domain when the specific subchannel is determined to be idle,
- wherein an end time for occupation of the specific subchannel by the wireless communication device is determined according to the time information.

6. The wireless communication device according to claim 5, wherein the processing circuitry is further configured to: acquire, from a base station, the one or more available resources in the domain, or determine the one or more available resources in the domain based on the broadcast information.

7. A wireless communication system, comprising: second wireless communication device configured to: select a resource in a domain to perform an uplink transmission on a specific subchannel; detect a signal energy on the specific subchannel to determine whether the specific subchannel is idle; and broadcast time information and the uplink transmission to a wireless communication device using the selected resource in the domain when the specific subchannel is determined to be idle, wherein the wireless communication device is configured to: receive the broadcasted uplink transmission and the time information on the specific subchannel in an unlicensed frequency band, wherein an end time for occupation of the specific subchannel by a specific terminal device is determined according to the time information; and update available resources in the domain based on the resource in the domain used by the uplink transmission, prior to the end time.

8. The wireless communication system according to claim 7, wherein the wireless communication device is further configured to: determine updated available resources in the domain by excluding the resource in the domain used by the uplink transmission from the domain resource pool.

9. The wireless communication system according to claim 7, wherein the processing circuitry wireless communication device is further configured to: broadcast the updated available resources in the domain in a licensed frequency band prior to the end time.

10. The wireless communication system according to claim 7, wherein the wireless communication device is further configured to:
- transmit the updated available resources in the domain to the specific terminal device in the licensed frequency band prior to the end time.

* * * * *